United States Patent
Jeon et al.

(10) Patent No.: US 10,634,182 B2
(45) Date of Patent: Apr. 28, 2020

(54) SHIM PLATE

(71) Applicant: LG Chem, Ltd., Seoul (KR)

(72) Inventors: Jae-Hyoung Jeon, Daejeon (KR);
Yang-Bae Jo, Daejeon (KR);
Won-Chan Park, Daejeon (KR)

(73) Assignee: LG Chem, Ltd. (KR)

( * ) Notice: Subject to any disclaimer, the term of this patent is extended or adjusted under 35 U.S.C. 154(b) by 140 days.

(21) Appl. No.: 15/580,415

(22) PCT Filed: May 31, 2016

(86) PCT No.: PCT/KR2016/005769
§ 371 (c)(1),
(2) Date: Dec. 7, 2017

(87) PCT Pub. No.: WO2017/018653
PCT Pub. Date: Feb. 2, 2017

(65) Prior Publication Data
US 2018/0149187 A1 May 31, 2018

(30) Foreign Application Priority Data

Jul. 30, 2015 (KR) .................... 10-2015-0108285

(51) Int. Cl.
*F16B 43/00* (2006.01)
*F16S 1/00* (2006.01)

(52) U.S. Cl.
CPC ............ *F16B 43/00* (2013.01); *F16B 43/007* (2013.01); *F16S 1/00* (2013.01)

(58) Field of Classification Search
CPC ..... F16B 43/003; F16B 43/005; F16B 43/007

USPC ................. 411/535, 539, 546, 547
See application file for complete search history.

(56) References Cited

U.S. PATENT DOCUMENTS

| 760,914 | A | * | 5/1904 | Newberry | |
| 1,368,525 | A | * | 2/1921 | Parks | F16B 43/007 301/68 |
| 3,285,568 | A | * | 11/1966 | Biach | B25B 29/02 254/29 A |

(Continued)

FOREIGN PATENT DOCUMENTS

| CN | 101824830 A | 9/2010 |
| DE | 674171 C | 7/1939 |

(Continued)

OTHER PUBLICATIONS

Search report from International Application No. PCT/KR2016/005769, dated Sep. 30, 2016.

(Continued)

*Primary Examiner* — Gary W Estremsky
(74) *Attorney, Agent, or Firm* — Lerner, David, Littenberg, Krumholz & Mentlik, LLP

(57) ABSTRACT

According to an aspect of the present disclosure, a shim plate which is inserted between components that are assembled to and disassembled from one another via at least one shaft may be provided. The shim plate includes a plurality of plate pieces that are separable from one another, wherein the plurality of plate pieces are configured such that one plate piece is connected to the other plate piece in a circumferential direction, and an internal ring-shaped empty space is formed.

7 Claims, 6 Drawing Sheets

(56) References Cited

U.S. PATENT DOCUMENTS

| | | | | |
|---|---|---|---|---|
| 4,485,607 | A * | 12/1984 | Nelson | E04B 1/2612 52/126.1 |
| 4,558,548 | A * | 12/1985 | Hieger | E04F 13/0826 16/DIG. 39 |
| 4,775,250 | A * | 10/1988 | Stewart | F16H 57/082 384/626 |
| 5,074,578 | A * | 12/1991 | Grove | B62D 17/00 280/86.753 |
| 5,145,113 | A | 9/1992 | Burwell et al. | |
| 5,316,061 | A * | 5/1994 | Lee | B27B 5/34 144/218 |
| 5,388,057 | A * | 2/1995 | January | B60G 3/26 356/155 |
| 5,501,575 | A * | 3/1996 | Eldredge | F01D 5/3015 416/144 |
| 5,755,464 | A * | 5/1998 | Erwin | F01N 13/1805 285/328 |
| 6,283,712 | B1 * | 9/2001 | Dziech | F01D 5/066 415/115 |
| 6,499,774 | B1 * | 12/2002 | Smith | F16L 23/08 285/363 |
| 7,055,655 | B2 * | 6/2006 | Takizawa | F16B 43/005 188/18 A |
| 8,888,431 | B2 * | 11/2014 | Haney | H01R 3/027 411/539 |
| 2002/0197133 | A1 | 12/2002 | Zacharias et al. | |
| 2004/0208729 | A1 | 10/2004 | Underwood et al. | |
| 2012/0038145 | A1 * | 2/2012 | Ramos | F16L 23/003 285/80 |
| 2015/0176664 | A1 | 6/2015 | Maehara et al. | |
| 2016/0131288 | A1 * | 5/2016 | Fontenot | F16L 23/003 29/402.08 |

FOREIGN PATENT DOCUMENTS

| | | |
|---|---|---|
| JP | S5196168 U | 8/1976 |
| JP | H06171475 A | 6/1994 |
| JP | H06344140 A | 12/1994 |
| JP | H07331689 A | 12/1995 |
| JP | 2000205234 A | 7/2000 |
| JP | 2014040908 A | 3/2014 |
| KR | 100953114 B1 | 4/2010 |
| KR | 20140065563 A | 5/2014 |

OTHER PUBLICATIONS

Errico, Michael E., "Don't Machine It . . . Shim It", Machine Design, May 1, 1977, vol. 49, No. 12, XP001600666.
Extended European Search Report for Application No. EP16830686 dated Nov. 20, 2018.

* cited by examiner

SHIM PLATE

CROSS-REFERENCE TO RELATED APPLICATIONS

The present application is a national phase entry under 35 U.S.C. § 371 of International Application No. PCT/KR2016/005769, filed May 31, 2016, which claims priority from Korean Patent Application No. 10-2015-0108285, filed on Jul. 30, 2015, in the Republic of Korea, the disclosures of which are incorporated herein by reference.

TECHNICAL FIELD

The present disclosure relates to a shim plate, and more particularly, to a shim plate for easily adjusting distances between components of an assembly device.

BACKGROUND ART

In general, in installation, operation and repair of industrial equipment such as a pump or a motor, an atomizer or a fan, a fixed bolt is used in axis alignment, and a shim plate is used to adjust a height of the fixed bolt.

The shim plate is a thin plate that is placed or inserted in order to adjust a height or a gap during axis alignment, and may be formed of a copper plate, an iron plate or paper.

FIG. 1 is a schematic cross-sectional view of an atomizer to which a shim plate according to the related art is applied, and FIG. 2 is a perspective view of the shim plate of FIG. 1.

The atomizer illustrated in FIG. 1 performs the function of turning a fine polymer solution into particles so as to efficiently dry and solidify a solvent during a polycarbonate manufacturing process.

The atomizer includes, as illustrated in FIG. 1, a steam nozzle part 10 for supplying steam and a polymer nozzle part 20 for supplying polymer.

A main body 21 of the polymer nozzle part is inserted into the inside of a main body 11 of the steam nozzle part. Steam may flow into a front end portion of the steam nozzle part main body 11 through a steam supply pipe 13, and polymer may be ejected to the front end portion of the steam nozzle part main body 11 through the polymer nozzle main body 21. The polymer ejected from the polymer nozzle main body 21 may contact steam at the front end portion of the steam nozzle part main body 11 to be atomized into polymer fine particles and ejected out of the steam nozzle part 10.

Meanwhile, the atomizer uses a shim plate 30 to adjust a flow rate of steam. In detail, as the shim plate 30 having an appropriate thickness is interposed between a flange 21 of the steam nozzle part and a flange 22 of the polymer nozzle part, an insertion depth of the polymer nozzle part 20 may be adjusted with respect to the steam nozzle part 10. That is, a relatively thin shim plate 30 is inserted into a flange gap G, and when a distance D illustrated in FIG. 1 is reduced, the flow rate of steam increases. On the other hand, when a relatively thick shim plate 30 is inserted into the flange gap G to widen the distance D, the flow rate of steam is reduced.

However, as illustrated in FIG. 2, the shim plate 30 according to the related art cannot be used unless a nut N is loosened from the flanges 12 and 22 and all of four shafts B are removed and then the polymer nozzle part 20 is completely separated from the steam nozzle part 10, and thus the installation of the shim plates 30 is not easy. In addition, repeated replacement of the shim plate 30 causes a problem such as damage to screw threads, thereby making maintenance, control and operation of the device difficult. Thus, a method for resolving this difficulty is required.

DISCLOSURE

Technical Problem

The present disclosure is designed to solve the problems of the related art, and therefore the present disclosure is directed to providing a shim plate that is easy to install between components assembled via shafts (for example, bolts).

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a shim plate which is inserted between components that are assembled with and disassembled from one another via at least one shaft, the shim plate including a plurality of plate pieces that are separable from one another, wherein the plurality of plate pieces are configured such that one plate piece is connected to the other plate piece in a circumferential direction, and an internal empty space is formed in a ring shape.

In another aspect of the present disclosure, the plurality of plate pieces may include one pair of first plate pieces disposed to face each other, and one pair of second plate pieces each disposed between the one pair of the first plate pieces.

In another aspect of the present disclosure, the one pair of first plate pieces may include a protrusion protruding from opposites sides with respect to an insertion direction between the components, wherein the one pair of second plate pieces includes a connection portion that is connected to the protrusion by surrounding at least a portion of the protrusion.

In another aspect of the present disclosure, the at least one shaft may be plural, and the one pair of first plate pieces and the one pair of second plate pieces may each include an external insertion portion having a greater width than a distance between two shafts from among the plurality of shafts and an internal insertion portion that is formed as a single unit with the external insertion portion and has an identical width as or a smaller width than the distance between the two shafts.

In another aspect of the present disclosure, a portion contacting the two shafts may be included, and a section having a gradually reducing width with respect to the contacting portion may be included.

In another aspect of the present disclosure, the internal insertion portion has a taper section having a gradually decreasing thickness toward an end.

In another aspect of the present disclosure, the plurality of plate pieces may include two plate pieces, wherein each of the two plate pieces includes at least one concave portion having a body that is inwardly recessed from an end of one side.

In another aspect of the present disclosure, the two plate pieces may include saw-toothed connection portions that are engaged with each other.

In another aspect of the present disclosure, the plurality of plate pieces have a thickness between 0.1 mm and 1 mm.

In another aspect of the present disclosure, there is also provided an atomizer including the shim plate described above. In the atomizer, a distance between components may be adjusted according to a thickness of the shim plate.

Advantageous Effects

In an aspect of the present disclosure, a plurality of separable plate pieces may be inserted into a gap between assembly components in a lateral direction, and thus, replacement or addition of a shim plate may be performed very easily. In addition, as the plurality of plate pieces are connected to one another in a circumferential direction, sealing properties may be improved.

BEST MODE

Figure 1:
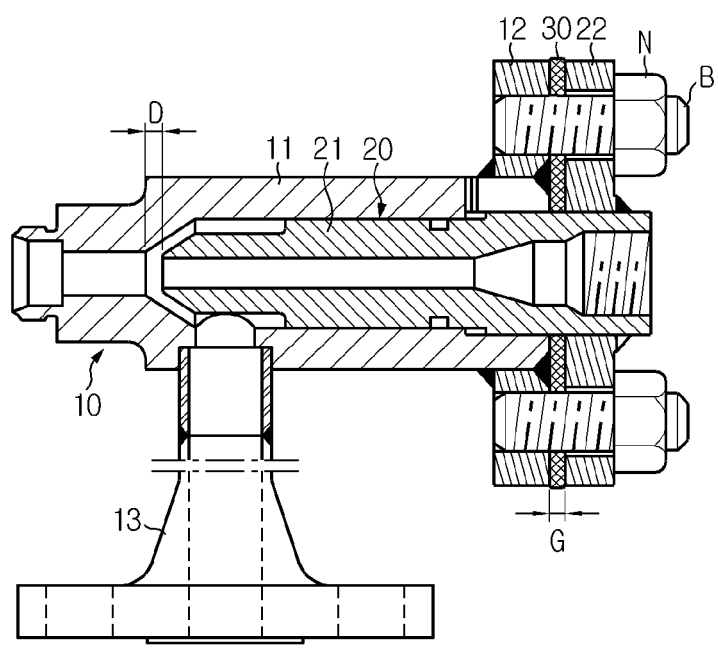
FIG. 1 is a schematic cross-sectional view of an atomizer to which a shim plate according to the related art is applied.
Figure 2:
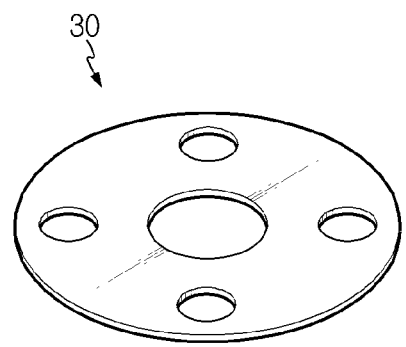
FIG. 2 is a perspective view of the shim plate of FIG. 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described and the drawings illustrated in the present specification are just a preferable example for the purpose of illustrations only, not intended to limit the scope of the disclosure, so it should be understood that other equivalents and modifications could be made thereto at the time of filing the present application without departing from the scope of the disclosure.

The embodiments of the present disclosure are provided so that this disclosure will be thorough and complete, and will fully convey the concept of the inventive concept to those skilled in the art, and thus the shape and size of components in the drawings may be exaggerated, omitted or schematically illustrated in the drawings for clear description. Thus, sizes or proportions of the components do not completely reflect actual sizes or proportions.

Figure 3:
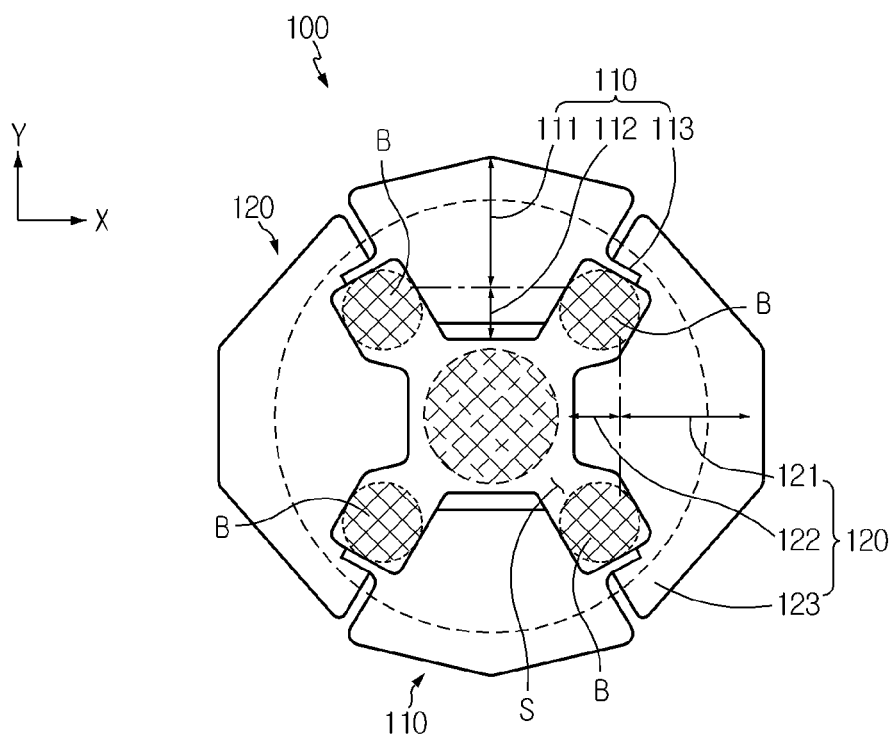
FIG. 3 is a top view of a shim plate according to an embodiment of the present disclosure.
Figure 4:
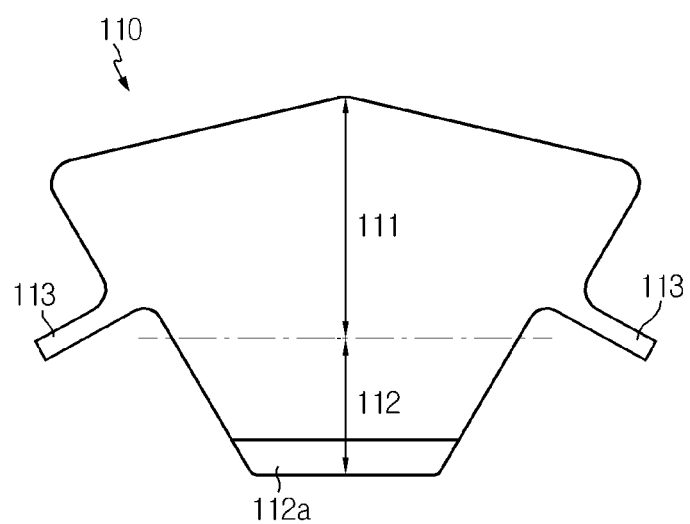
FIG. 4 is a top view of a first plate piece of FIG. 3.
Figure 5:
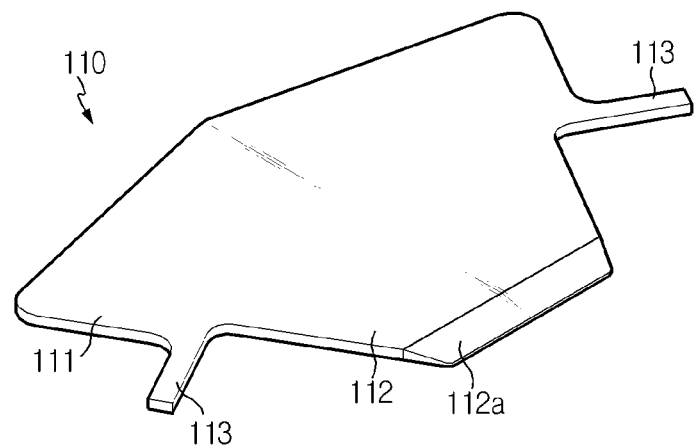
FIG. 5 is a lateral perspective view of FIG. 4.
Figure 6:
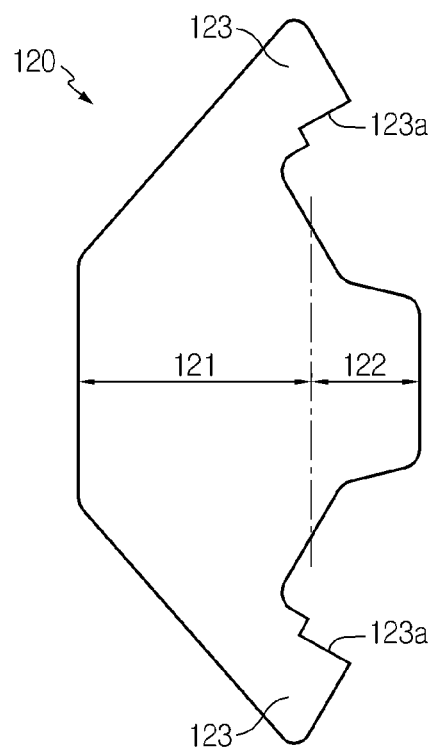
FIG. 6 is a top view of a second plate piece of FIG. 3.

FIG. 3 is a top view of a shim plate according to an embodiment of the present disclosure. FIG. 4 is a top view of a first plate piece of FIG. 3. FIG. 5 is a lateral perspective view of FIG. 4. FIG. 6 is a top view of a second plate piece of FIG. 3.

Referring to the drawings, a shim plate 100 according to an aspect of the present disclosure may include a plurality of plate pieces 110 and 120 that are configured to be separable from each other. In addition, the plurality of plate pieces 110 and 120 may be configured such that one plate piece 110 is interconnectable to the other, adjacent plate piece 120 in a circumferential direction.

The plurality of plate pieces 110 and 120 that are connected as described above may form an internal ring-shaped empty space S. That is, as illustrated in FIG. 3, the plurality of plate pieces 110 and 120 may be assembled to be connected to each other in a circumferential direction so as to surround the shafts B (bolts) which form an axis center, such that an empty space S is formed inside.

In particular, an embodiment of the present disclosure to be described below illustrates the shim plate 100 that is configured to be applicable to the atomizer illustrated in FIG. 1. The atomizer (see FIG. 1) may be configured such that components, that is, the flange 12 of the steam nozzle part and the flange 22 of the polymer nozzle part are assembled or disassembled to and from each other via the four shafts B (bolts). The shim plate 100 according to an embodiment of the present disclosure may be configured to avoid the four shafts B (bolts) and to be inserted into a gap between the flange 12 of the steam nozzle part and the flange 22 of the polymer nozzle part (hereinafter referred to as the flange gap G) in a lateral direction of the atomizer.

In the present embodiment, the plurality of plate pieces 110 and 120 may include two first plate pieces 110 and two second plate pieces 120.

The one pair of first plate pieces 110 may each have the same shape and may be disposed to face each other. For example, the one pair of first plate pieces 110 may be, as illustrated in FIG. 3, inserted into the flange gap G (see FIG. 1) symmetrically with respect to an X-axis.

In addition, one pair of second plate pieces 120 may also have the same shape and may be each inserted between the one pair of first plate pieces 110. That is, they may be inserted into the flange gap G symmetrically with respect to a Y-axis. Here, in terms of the order, the one pair of first plate pieces 110 may be inserted first, and then the one pair of second plate pieces 120 may be inserted. This will be described in more detail later.

The first plate pieces 110 and the second plate pieces 120 may respectively include external insertion portions 111 and 121 and internal insertion portions 112 and 122.

Referring to FIG. 3, the external insertion portions 111 and 121 may be defined to be portions having a width that is at least greater than a distance between two shafts B, and the internal insertion portions 112 and 122 may be defined to be portions having the same width as or a smaller width than the distance between the two shafts B.

Insertion of the external insertion portions 111 and 121 of the first and second plate pieces 110 and 120 may be limited and thus the external insertion portions 111 and 121 may be located outside the two shafts B, and the internal insertion portions 112 and 122 may be inserted deeply into the flange gap G between the two shafts B.

The first and second plate pieces 110 and 120 according to the present embodiment include the external insertion portions 111 and 121 and the internal insertion portions 112 and 122 that are formed as a single unit and that have continuously decreasing widths. Accordingly, the internal insertion portions 112 and 122 may have portions that are in contact with the two shafts B.

In addition, the internal insertion portion 112 of the first plate piece 110 may be configured, as illustrated in FIGS. 3 and 4, to have a width that gradually decreases into the flange gap G in an area that is in contact with the two shafts B. Meanwhile, the internal insertion portion 122 of the second plate piece 120 may be configured to have a width that gradually decreases and then becomes almost constant.

According to the first and second plate pieces 110 and 120, an internal insertion portion may be inserted more broadly and deeply into the flange gap G so that a distance between the steam nozzle part 10 and the polymer nozzle part 20 may be maintained more stably.

In addition, the external insertion portions 111 and 121 and the internal insertion portions 112 and 122 which are in contact the two shafts B may limit locations of the first and second plate pieces 110 and 120 and insertion depths thereof. In other words, when the first and second plate pieces 110 and 120 are inserted into the flange gap G between the two shafts B to some extent, opposites sides of the internal insertion portions 112 and 122 come into contact with the two shafts B, and thus no more insertion may be possible.

Accordingly, an insertion depth of the first and second plate pieces 110 and 120 may be limited to a depth at which opposites sides of the internal insertion portions 112 and 122 are in contact with the two shafts B. When locations and insertion depths of the first and second plate pieces 110 and 120 are set as above, assembly or connection of the first and second plate pieces 110 and 120 may be remarkably easy.

In order to assemble or connect the first and second plate pieces 110 and 120, the first plate piece 110 further includes a protrusion 113, and the second plate piece 120 further includes a connection portion 123.

The protrusion 113 and the connection portion 123 may be connected to each other and form a sealing line of the shim plate 100 when the first and second plate pieces 110 and 120 are completely inserted into the flange gap G.

The protrusion 113 may be configured to protrude from opposites sides of the first plate pieces 110. For example, the protrusion 113 has a rectangular pillar shape in the present embodiment, but may also have any shape such as an oval or a polygon.

As illustrated in FIGS. 3 and 4, the first plate piece 110 may include two protrusions 113, each on opposites sides. The protrusion 113 may preferably be located right above the internal insertion portion 112. In this case, an insertion depth of the first plate piece 110 may also be limited by the protrusion 113. In addition, as the protrusion 113 is located more in an outer portion compared to the shaft B inside the flange gap G, connection to the connection portion 123 of the second plate piece 120 may be easier.

The connection portion 123 may be configured, as illustrated in FIGS. 3 and 6, to have unfolded wing shapes with respect to the internal insertion portion 122 of the second plate piece 120. While the first plate piece 110 is first inserted into the flange gap G, the second plate piece 120 may be inserted into the flange gap G such that the connection portion 123 covers an external surface of the protrusion 113. Here, the connection portion 123 may include a step 123a that adheres to at least a portion of the protrusion 113, that is, that adheres to the protrusion 113 by surrounding an external surface of the protrusion 113. The step 123a may be formed to have a length and width corresponding to a length and width of the protrusion 113.

By using the protrusion 113 and the connection portion 123 as described above, the first and second plate pieces 110 and 120 may be connected to each other in a circumferential direction. Thus, according to the configuration, even when the shim plate 100 according to the present disclosure is divided into a plurality of plate pieces, airtightness of the flange gap G may be secured, thereby preventing leakage of steam or polymer.

The internal insertion portions 112 and 122 of at least one of the first plate piece 110 and the second plate piece 120 may further include a taper section 112a having a thickness that gradually decreases towards an end.

For example, as illustrated in FIGS. 3 and 5, as the internal insertion portion 112 of the first plate piece 110 includes the taper section 112a, it may be easy to insert the first plate piece 110 even into the small flange gap G.

The plurality of plate pieces 110 and 120 may be a metal such as a copper plate or a stainless aluminum alloy having a thickness in a range between 0.1 mm and 1 mm. However, the scope of the present disclosure should not be limited thereto. That is, a thickness or material of the plurality of plate pieces 110 and 120 are not particularly limited as long as they are formed of materials having mechanical rigidity.

Figure 7:
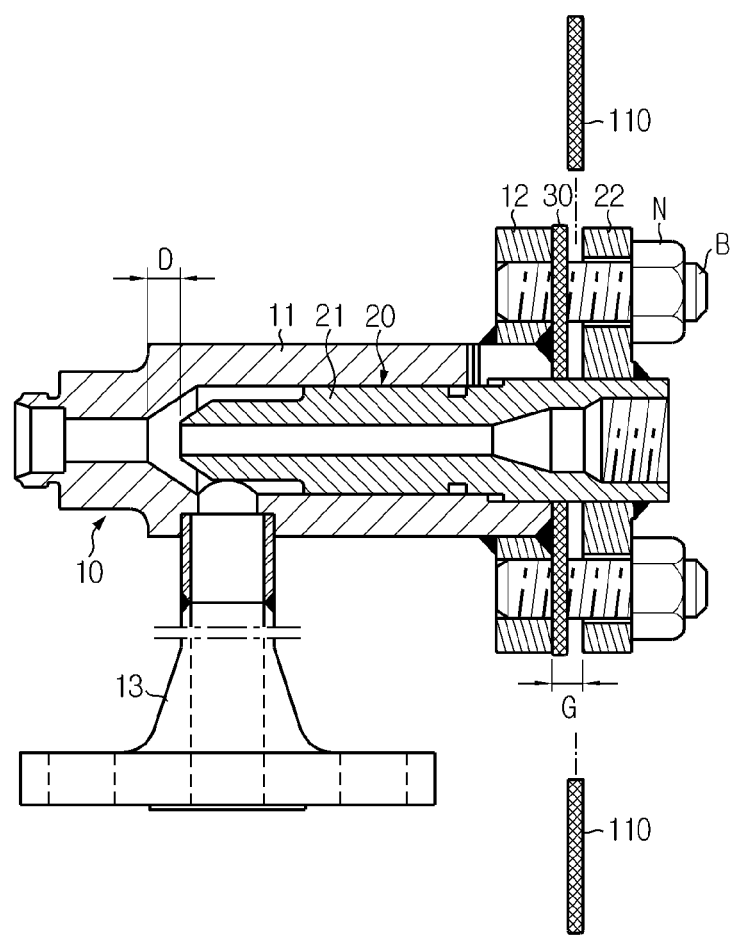
FIGS. 7 and 8 are views for explaining an example of additionally installing a shim plate according to an embodiment of the present disclosure, to the atomizer of FIG. 1.
Figure 8:
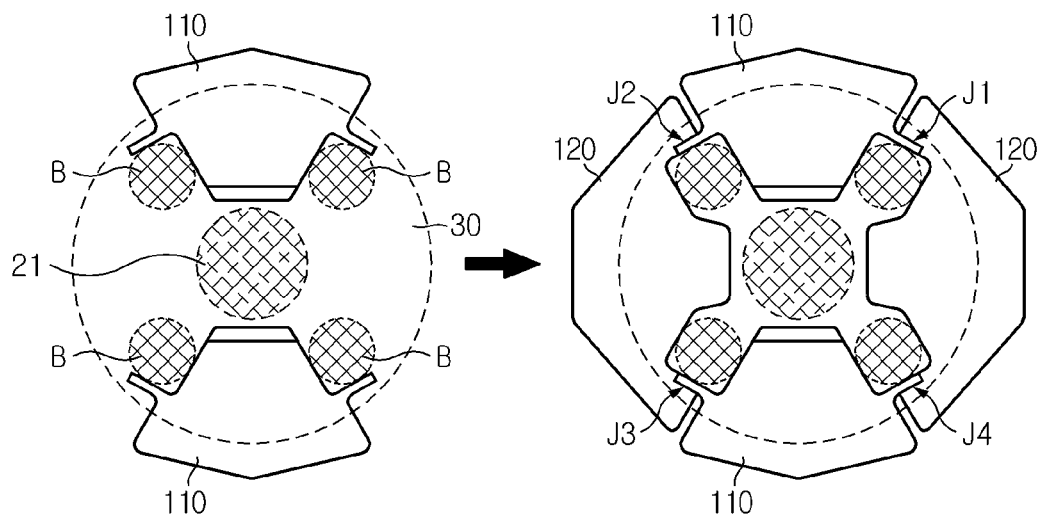

Next, referring to FIGS. 7 and 8, a usage example of the shim plate 100 according to an embodiment of the present disclosure will be briefly described.

First, as illustrated in FIG. 7, in order to form a gap G between the steam nozzle flange and the polymer nozzle flange, the four shafts B (bolts) are adequately loosened so as to make the shim plate 100 ready to be inserted.

Next, as illustrated in (a) of FIG. 8, one first plate piece 110 is inserted into the flange gap G in a lateral direction, and the other first plate piece 110 is inserted in the opposite direction, that is, in a symmetrical direction. Here, as described above, an insertion depth and location of the first plate piece 110 may be spontaneously determined by the internal insertion portion 112 and the protrusion 113.

Next, as illustrated in (b) of FIG. 8, one pair of second plate pieces 120 are inserted into empty space of the flange gap G. When the second plate pieces 120 are completely inserted, the connection portions 123 of the one pair of second plate pieces 120 may be connected to the protrusions 113 of the one pair of first plate pieces 110 as marked by J1, J2, J3, J4 of (b) of FIG. 8.

As described above, according to the configuration of the shim plate 100 of the present disclosure, the first and second plate pieces 110 and 120 may be inserted into the flange gap G in a lateral direction, and thus, the shim plate 100 may be replaced or added without completely separating the steam nozzle part 10 and the polymer nozzle part 20. Thus, an operation of adjusting a flow rate of steam of the atomizer may be easier, and moreover, time needed for the operation may be remarkably reduced.

In addition, just by inserting the shim plate 100 of the present disclosure into the flange gap G, the plurality of plate pieces may be closely connected to one another. Thus, assembly properties and sealing properties of the shim plate 100 of the present disclosure are highly excellent, and thus, when used in a device such as an atomizer, from which a liquid or gas is likely to leak, stability may be enhanced.

Figure 9:
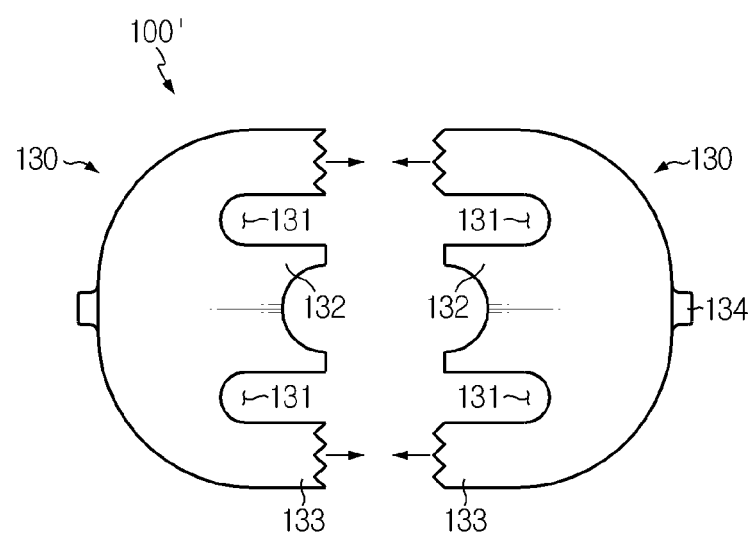
FIG. 9 is a view illustrating a structure of a shim plate according to another embodiment of the present disclosure.
Figure 10:
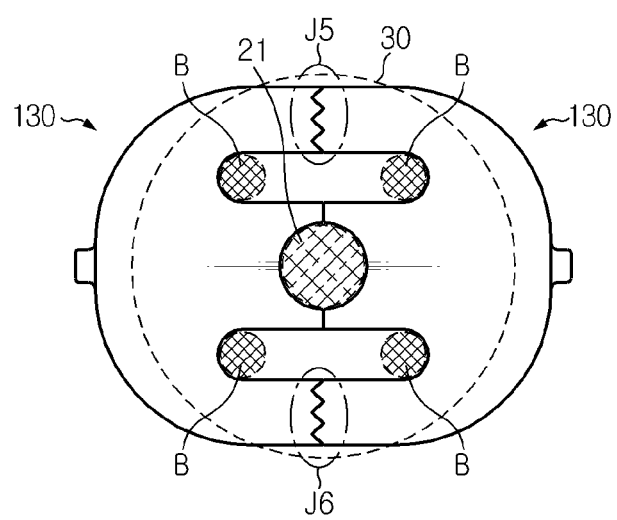
FIG. 10 is a view for explaining an example of additionally installing a shim plate according to another embodiment of the present disclosure, to the atomizer of FIG. 1.

FIG. 9 is a view illustrating a structure of a shim plate 100' according to another embodiment of the present disclosure. FIG. 10 is a view for explaining an example of additionally installing the shim plate 100' according to another embodiment of the present disclosure, to the atomizer of FIG. 1.

Referring to the drawings, the shim plate 100' according to the present embodiment includes two plate pieces 130, compared to the above-described embodiment, and may include at least one concave portion 131 having a body that is inwardly recessed from one end.

The two plate pieces 130 are provided as a pair, and may be inserted into the flange gap G in a direction in which they face each other.

The plate pieces 130 may include two concave portions 131, each on both sides with respect to the internal insertion portion 132.

As illustrated in FIG. 10, by inserting the plate piece 130 into the flange gap G, a shaft B may be located in each inner portion of the two concave portions 131.

In addition, the two plate pieces 130 according to the present embodiment may include connection portions 133 in a saw-toothed form. The saw-toothed connection portions 133 included in the two plate pieces 130 may be configured to be engaged with each other. The connection portions 133 may be each included on both side portions of the plate piece 130.

For example, as shown by J5, J6 denoted in FIG. 10, as the connection portions 133 of the two plate pieces 130 are engaged with each other in a saw-toothed structure, coupling properties and sealing properties of the shim plate 100' may be improved.

In addition, the two plate pieces 130 may further include a grip portion 134 that an operator may grip by hand. By including the grip portion 134 in the plate piece 130 as described above, the plate pieces 130 may be easily inserted into the flange gap G.

In addition, as the shim plate 100' according to the present embodiment includes two plate pieces 130, the shim plate 100' may be replaced or added more quickly.

Meanwhile, an atomizer according to the present disclosure may include the shim plate 100 described above. According to the atomizer, by using the shim plate 100 described above, a distance between the polymer nozzle part 20 for supplying polymer and the steam nozzle part 10 for supplying steam may be adjusted.

While the present disclosure have been described with reference to the exemplary embodiments, the present disclosure is not limited by the above-described particular embodiments, and it will be understood by those of ordinary skill in the art that various changes in form and details may be made therein without departing from the spirit and scope as defined by the following claims, and all of such possible modifications are intended to fall within the scope of description of the claims of the present disclosure.

Meanwhile, while terms indicating directions such as "upward" or "downward", and "to the left" or "to the right" are used in the present disclosure, the terms are used for convenience of description, and it will be obvious to one of ordinary skill in the art that the terms may be differently expressed depending on a viewpoint of an observer or locations of an object.

What is claimed is:

1. A shim plate configured to be inserted between components that are assembled with and disassembled from one another via at least one shaft, the shim plate comprising a plurality of plate pieces that are separable from one another,
wherein the plurality of plate pieces are configured such that each plate piece is in contact with two other adjacent ones of the plate pieces in a circumferential direction, forming an internal empty space in a ring shape, each of the plurality of plate pieces having a first surface, the first surfaces of the plate pieces together defining a single common planar surface,
wherein the plurality of plate pieces comprise one pair of first plate pieces disposed to face each other across the internal empty space, and one pair of second plate pieces each disposed between the one pair of the first plate pieces and facing each other across the internal empty space, and
wherein the internal empty space is configured to accommodate the shaft extending through a central portion of the internal empty space, and is configured to accommodate four bolts extending through peripheral portions of the internal empty space, each of the bolts extending perpendicular to the single common planar surface between confronting outer peripheral edges of one of the first plate pieces and one of the second plate pieces.

2. The shim plate of claim 1, wherein the at least one shaft is provided in a plural number, and
the one pair of first plate pieces and the one pair of second plate pieces each comprises an external insertion portion having a greater width than a distance between two shafts from among the plurality of shafts and an internal insertion portion that is formed integrally with the external insertion portion and has a width equal to or less than the distance between the two shafts.

3. The shim plate of claim 2, wherein the internal insertion portion comprises a portion contacting the two shafts and a section having a gradually reducing width with respect to the contacting portion.

4. The shim plate of claim 1, wherein the plurality of plate pieces have a thickness between 0.1 mm and 1 mm.

5. An atomizer comprising the shim plate according to claim 1.

6. A shim plate configured to be inserted between components that are assembled with and disassembled from one another via at least one shaft, the shim plate comprising a plurality of plate pieces that are separable from one another,
wherein the plurality of plate pieces are configured such that one plate piece is connected to the other plate piece in a circumferential direction, forming an internal empty space in a ring shape,
wherein the plurality of plate pieces comprise one pair of first plate pieces disposed to face each other, and one pair of second plate pieces each disposed between the one pair of the first plate pieces, and
wherein the one pair of first plate pieces comprises a protrusion protruding from opposites sides with respect to an insertion direction between the components, and
the one pair of second plate pieces comprises a connection portion that is connected to the protrusion by surrounding at least a portion of the protrusion.

7. A shim plate inserted between components that are assembled with and disassembled from one another via at least one shaft, the shim plate comprising a plurality of plate pieces that are separable from one another,
wherein the plurality of plate pieces are configured such that one plate piece is connected to the other plate piece in a circumferential direction, forming an internal empty space in a ring shape,
wherein the plurality of plate pieces comprise one pair of first plate pieces disposed to face each other, and one pair of second plate pieces each disposed between the one pair of the first plate pieces,
wherein the at least one shaft is provided in a plural number, and the one pair of first plate pieces and the one pair of second plate pieces each comprises an external insertion portion having a greater width than a distance between two shafts from among the plurality of shafts and an internal insertion portion that is formed integrally with the external insertion portion and has a width equal to or less than the distance between the two shafts, wherein the internal insertion portion comprises a portion contacting the two shafts and a section having a gradually reducing width with respect to the contacting portion, and wherein the internal insertion portion has a taper section having a gradually decreasing thickness toward an end.

* * * * *